Nov. 15, 1927.
C. R. ANDERSON
1,649,437
BUSHING REMOVING TOOL
Filed May 27, 1926
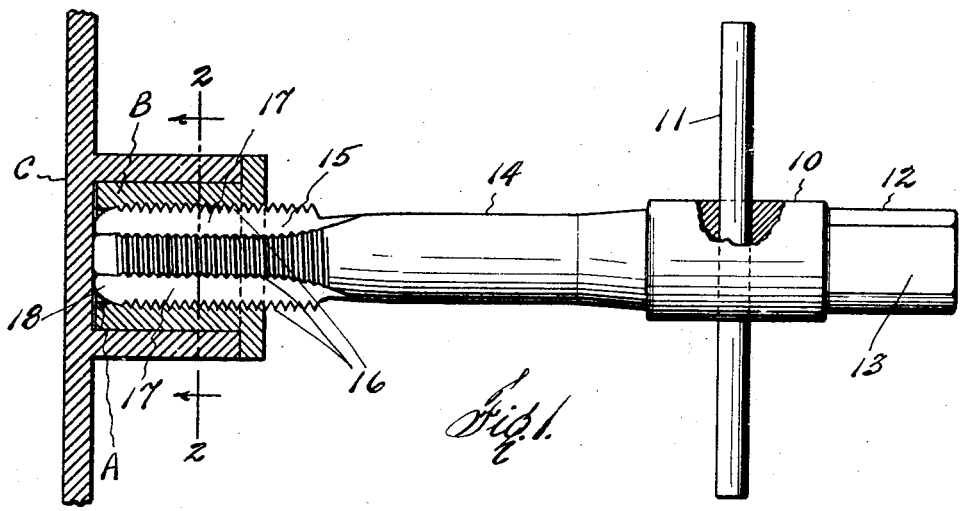
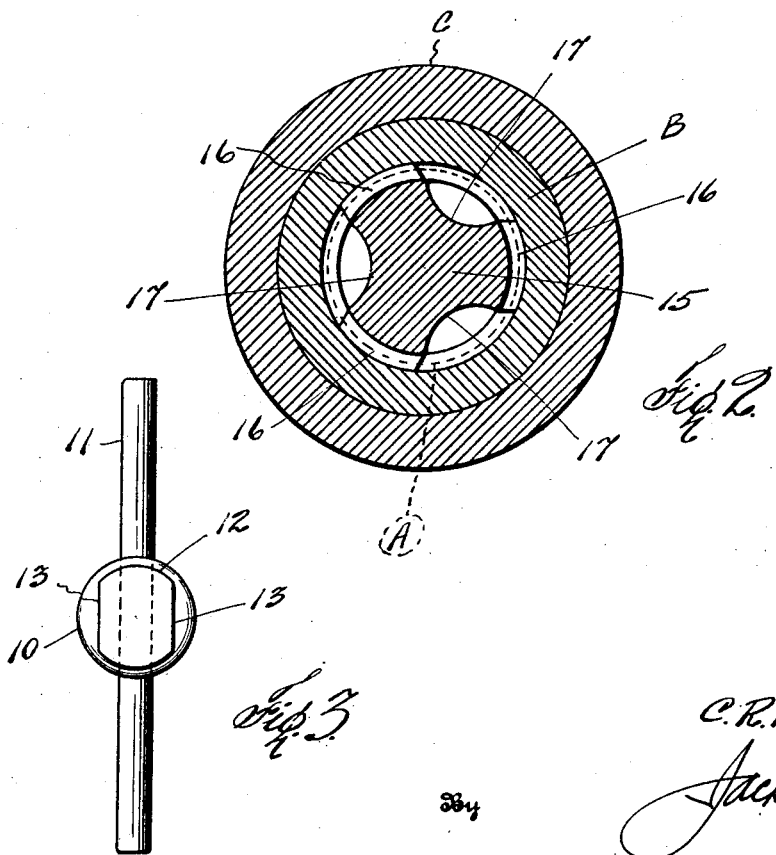
Inventor
C. R. Anderson
By Jack N. Ehley
Attorney Patented Nov. 15, 1927.

1,649,437

UNITED STATES PATENT OFFICE.

CHARLES R. ANDERSON, OF DALLAS, TEXAS.

BUSHING-REMOVING TOOL.

Application filed May 27, 1926. Serial No. 112,015.

This invention relates to new and useful improvements in bushing removing tools.

The object of the invention is to provide means for removing soft metal bushings in an easy and expeditious manner.

A further object of the invention is to provide a tool arranged to be screwed into a bushing while held stationary, whereby continued rotation of the bushing will back the latter out of its socket and cause it to travel on the screw threads of the tool.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is an elevation of a tool constructed in accordance with my invention,

Fig. 2 is an enlarged cross-sectional view taken on the line 2—2, and

Fig. 3 is an end view of the tool.

In the drawings the numeral 10 designates the head of a tool having a cross-bar handle 11 extending therethrough. A boss 12 extends from the head and is provided with opposite flat sides or cheeks 13.

A reduced cylindrical shank 14 extends from the other end of the head. At the outer end of the shank an enlarged cylindrical body 15 is provided and formed with longitudinal screw-threaded panels 16. Longitudinal channels or grooves 17 are provided between the panels.

On the outer end of the body a reduced nose 18 is formed free from screw threads. This nose guides the tool into the bore A of the bushing B and also engages the housing C at the bottom of the socket. It should therefore be finished smooth so as to readily turn while in engagement with the housing.

In using the tool the cheeks 13 of the boss 12 are secured in a vise with the shank 14 and body 15 directed vertically and upwardly. The workman grasps the housing and inverts it so that the nose 18 of the tool is received in the bore A of the bushing B. The tool thus being centered in the bore, the housing is rotated, whereby the screw threads of the panels 16 imbed themselves in said bore and the bushing travels down the body 15 until the nose engages the wall of the housing C at the bottom of the housing socket.

When the nose engages the housing, continued rotation of the housing will cause the bushing to continue to travel on the thread panels, while the housing will cease to travel longitudinally relatively of said panels. This will force the bushing from the socket. After the bushing is removed it is suitably held either in a vise or by hand and the tool rotated in a counter clockwise direction by means of the handle bar 11, whereby it is withdrawn from the bushing.

Various changes in the size and shape of the different parts, as well as modifications and alterations, may be made within the scope of the appended claim.

What I claim, is:

A bushing removing tool comprising a head, a boss extending from one end of the head and having opposite cheeks, a shank extending from the other end of the head, an elongated non-tapering body extending from the shank, longitudinal screw-threaded panels extending the full length of the body, and a nose on the free end of the body abruptly reduced from the ends of the thread panels, whereby a bearing member is provided at the free end of the head and the threads are continued to said member for giving amplified thread surfaces for engaging within the bushing.

In testimony whereof I affix my signature.

CHARLES R. ANDERSON.